July 17, 1951
C. ODDS
2,561,033
HEADLIGHT
Filed Dec. 2, 1950
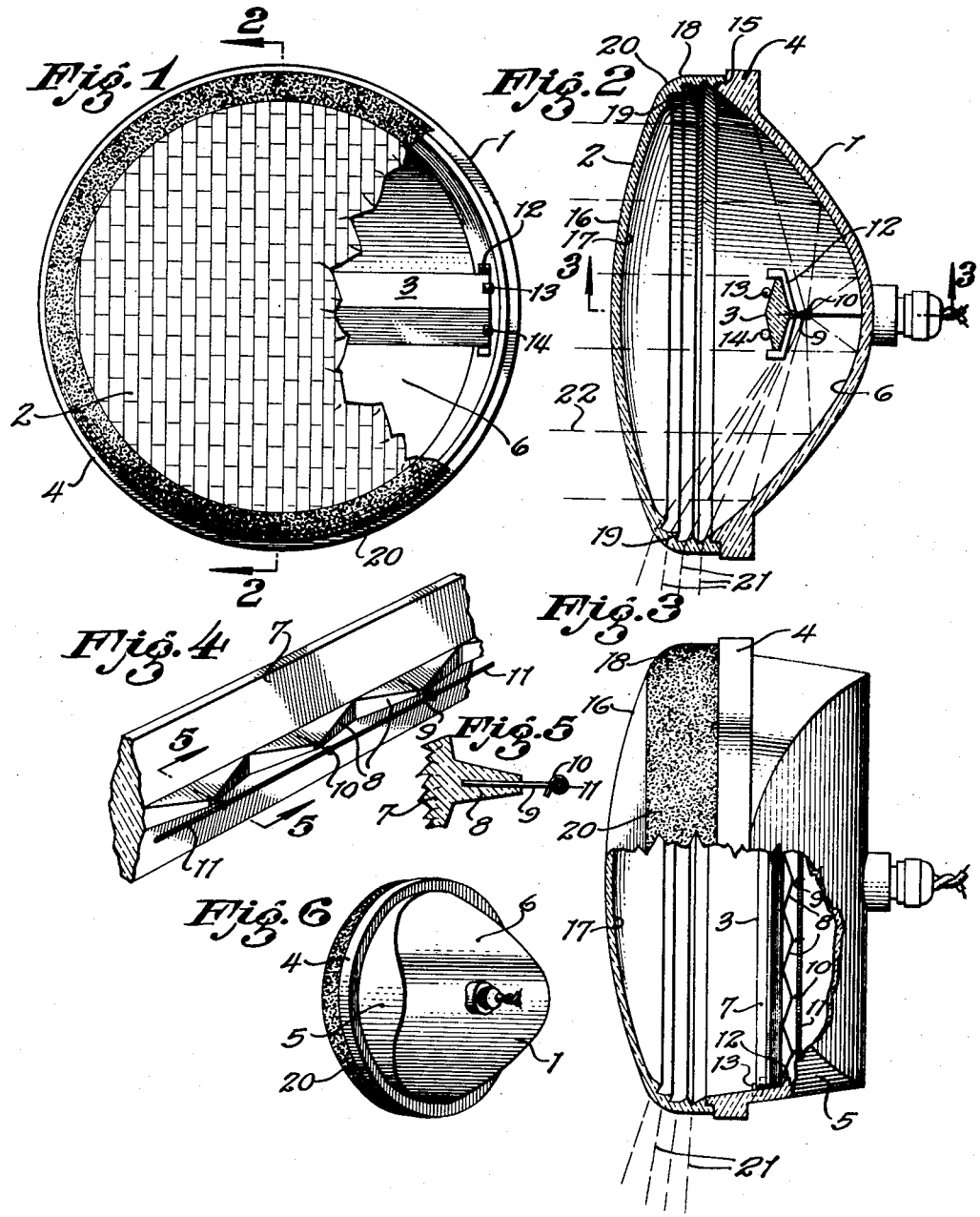
Inventor,
CHARLES ODDS
By Calvin Brown
Attorney Patented July 17, 1951

2,561,033

UNITED STATES PATENT OFFICE 2,561,033

HEADLIGHT

Charles Odds, Hollywood, Calif.

Application December 2, 1950, Serial No. 198,836

7 Claims. (Cl. 313—113)

The present invention relates to headlights generally, and specifically to a headlight for use on automobiles, and elsewhere. The present headlight provides a construction which incorporates features adapted to render the headlight substantially non-glaring. In addition to the non-glare characteristics of the headlight, the headlight affords comfort to the automobile driver, in that a roadway is illuminated horizontally and, for the average road, from curbing to curbing.

The average headlight now on the market supposedly does not glare or tend to blind an oncoming driver of an automobile or a pedestrian. However, automobiles are subjected to road sway, must climb hills and go down hills, with the result that the headlight and light emitted therefrom will vary as to vertical displacement of beam. Such vertical displacement of beam is often very confusing to the on-coming motorist and may result in an automobile accident.

The present invention has for an object the provision of a headlight, the beam emitted from which is at all times maintained collimated, which light beam is without glare to the on-coming motorist, pedestrian, or others, which lights a roadway horizontally over a greater area than common headlights now known to the inventor, and which provides a maximum of safety to the driver of the vehicle utilizing such a headlight.

The present headlight, by illuminating both sides of the road, close to the car, aids in the prevention of accident, not only to pedestrians who will be illuminated and easily seen, but also cars following and passing a vehicle are immediately observed, parking the vehicle may be easily accomplished as the side of the road is illuminated, driving in mountains and around curves is easy of accomplishment as the side beam will illuminate the full curve of the road, thus preventing accident, whereas the average headlight has its beam projected straight ahead and the curve is unilluminated, thus often resulting in driver confusion and accident.

A further object is the provision of a headlight of attractive appearance, inexpensive in cost of manufacture, rigid in structure, easily installed in a vehicle, and generally superior to headlights now known to the inventor.

With the above mentioned and other subjects in view, the invention consists in the novel and useful provision, formation, construction, association, and relative arrangement of parts, members and features, all as shown in one embodiment in the accompanying drawing, described generally, and more particularly pointed out in the claims.

In the drawing:

Figure 1 is a fragmentary front elevation of the headlight of the invention,

Figure 2 is a sectional view on the line 2—2 of Figure 1,

Figure 3 is a fragmentary sectional view on the line 3—3 of Figure 2,

Figure 4 is a fragmentary, partially sectional view of the filament support for the headlight, Figure 5 is a fragmentary sectional view on the line 5—5 of Figure 4, and Figure 6 is a rear perspective view of the headlight.

Referring now with particularity to the drawing, the headlight includes a reflector 1, of special construction, to be hereinafter detailed, a lens 2, and means 3 within the reflector and affording a source of light.

The reflector 1 is of such shape and form as to fit within standard headlight casings or shells, the present headlight being substituted for whatever headlight is within said shell. The reflector 1 has the appearance shown in Figure 6, and said reflector is formed of any material desired, such as metal or glass, the inner surface of which is silvered, or otherwise treated, so as to readily reflect light rays. In construction, the reflector is provided with a circular rim 4, with diametrically opposite portions of the reflector conical surfaced, as shown for side 5, the opposite diametric side being similarly constructed, the said sides, such as 5, being intersected by a parabolic cylindrical surface 6.

The means 3 includes a filament support bar 7 preferably formed of translucent material, such as a translucent or surface treated glass, which, in the present instance, is substantially a rhombus in cross-section, which bar is provided on one surface at the vertex portion between two sides with a series of substantially triangular prisms 8. The said triangular prisms 8 extend longitudinally of the bar, as shown in Figure 4. Filament support wires 9 have their shanks embedded within the prisms 8 and extend outwardly of the apices of said prisms, said wires being looped at 10. The loops of the wires support an elongated filament 11, which extends longitudinally of the bar.

The filament support bar 3 extends diametrically of the reflector and forwardly of a line which includes the focus of the reflector (see Figures 1 and 3), the said reflector on its inner surface being provided at diametric points with bar supports. In the present instance, said bar supports constitute members 12, conforming to the section of the bar 3, and engaging the filament sides of said bar and the top and bottom thereof, together with pegs or pins 13 and 14 in engagement with the opposite sides of the bar (see Figure 2). This provides a rigid support for the bar 3 within the reflector 1. It is intended that the arrangement should be such that the filament 11 will lie substantially at the line focus of the parabolic cylindrical surface 6.

The rim 4 is annularly shouldered at 15 to receive and support the lens 2. While the lens may be conventional in form, still I prefer to utilize, in the present invention, a lens of the type shown in the drawing wherein the said lens is provided with an outer convex surface and an inner concave surface, as shown at 16 and 17, respectively, this area being preferably of clear glass, together with an integrally formed annular side 18 formed to fit on the shoulder 15, as shown in Figure 2. The inner surface of the annular side 18 is provided with annular prisms designated generally as 19, of which there may be several, and in the present instance three. The outer surface of said lens at the annular side 18 is so treated as to provide what is commonly known as a maze, as indicated at 20.

It is intended that after the lens has been fitted on the reflector shoulder 15, that the lens and reflector should be fused together, it being the intent that a vacuum should be maintained within the headlight. Ends of the filament 11 are brought through the reflector in the ordinary manner, and connected to a suitable plug.

The operation, uses and advantages of the invention just described are as follows:

The present headlight, due to its construction, affords a light which will effectively illuminate the roadway a considerable distance ahead of the vehicle, to the end that the driver may have ample time to stop the vehicle before reaching an object. The present invention also provides a headlight which is brilliant at the edge of the road and close to the car, whereby the roadway may be clearly viewed by the driver of the vehicle in spite of headlight glare from an on-coming vehicle and, further, the present headlight permits full width view of the road to the immediate sides of the vehicle being driven, and for a considerable distance ahead of the vehicle. In addition to the foregoing, the present headlight is "glareless" to approaching pedestrians and vehicle drivers.

By providing a horizontal filament, placed rearward of a filament support bar, which bar is translucent in nature, the filament when incandescing is not visible forwardly of the headlight. The light rays from the filament strike the cylindrical parabolic surface in the manner shown in Figure 2, the reflected rays being directed substantially horizontally outwardly from said reflector. Rays from the filament striking the prisms shown at 19 are directed substantially sidewardly and outwardly, as shown at 21, which reflected rays, however, are diffused by the maze glass at this zone and serve to illuminate the roadway to the immediate sides of the car, and directly in front of the car. Quite obviously, the headlight may be tilted downwardly in the ordinary manner, as adjustment is provided for this purpose in all headlight shells, and, as a consequence, the reflected horizontal rays 22 may be directed so as to strike the ground at a given distance ahead of the vehicle and in accordance with the law for any given State. Usually, this distance is 200 feet ahead of the vehicle, and the top most horizontal light ray is the same as the average height of the top of the headlight above the street, to-wit, 33 inches. As the height of the average driver's eye above the street is 45 inches, there is an allowance of 12 inches for unevenness in the roadway, which would cause the headlight to move its beam vertically.

With the present headlight, there is no necessity for any switch from a so-called "bright" to "dim," as there is no glare from the filament.

One of the hazards of driving occurs just after sunset. The headlight of the present invention will illuminate pedestrians and vehicles crossing from either side of a roadway without blinding the pedestrian, and at the same time, afford driving comfort for the driver of the vehicle.

The sides 5 of the reflector preferably are so treated on the inner surface thereof as to diffuse light rays at this zone. I accomplish this by coating the interior surface of said sides a dull gloss.

The sides 5 of the headlight may be other than round, and in fact may assume any geometrical form desired, from square to round.

It is obvious that the construction of the headlight may be varied, such as by providing more or fewer prisms at 19; the support for the filament may be changed as long as the principle of the invention is retained, to-wit, the filament horizontally placed and not visible forwardly of the headlight; and said filament may vary in character, such as by providing double filament wires, spirally wound wire, and the like, all, however, without departing from the spirit of the present invention as defined by the appended claims.

I claim:

1. A headlight including a reflector, a lens for said reflector, said reflector having a parabolic cylindrical reflecting surface, and an elongated filament extending across the reflector on a line which includes the focus of the reflector.

2. A headlight including a reflector having a reflector surface of cylindrical parabolic form, a lens carried by said reflector forwardly of the reflecting surface thereof, an elongated filament lying on a line which includes the focus of the reflector, and a translucent support for said filament interposed between the lens and said filament.

3. A headlight including: a reflector formed with a circular rim, a curved side wall joining said rim, and a cylindrical parabolic surface intersecting the curved side wall thereof; a lens carried by the rim of said reflector, and an elongated filament within and extending across the reflector and lying on a line which includes the focus of the reflector.

4. A headlight including: a reflector formed with a circular rim, a curved side wall joining said rim, and a cylindrical parabolic surface intersecting the curved side wall thereof; a lens carried by the rim of said reflector, an elongated filament within the reflector and lying on a line which includes the focus of the reflector, and a translucent bar carried within said reflector between the lens and the filament and supporting said filament.

5. A headlight including a reflector, a lens carried by said reflector, an elongated filament in the reflector and lying on a line which includes the focus of the reflector, translucent means extending across the reflector supporting the filament, and positioned between the said filament and said lens, rays of light from said filament when the filament incandesces striking the marginal portions of said lens, and annular prisms for said lens at said marginal portions for reflecting said incident rays of light in a direction substantially at right angles to the axis of said lens.

6. A headlight including a reflector having a reflector surface, a translucent bar extending across said reflector, means of support for said bar carried by the reflector, a filament carried by and positioned between said bar and said reflector, the said bar obscuring observation of said filament, and a lens carried by the reflector.

7. A headlight including a reflector having a filament therein, and a lens carried by the reflector forwardly of the filament; said lens having an annular side wall portion, the inner surface of which is provided with an annular prism, and the outer surface of which is translucent.

CHARLES ODDS.

REFERENCES CITED

The following references are of record in the file of this patent:

UNITED STATES PATENTS

| Number | Name | Date |
|---|---|---|
| 2,456,166 | Arenberg | Dec. 14, 1948 |
| 2,488,751 | Verbeek | Nov. 22, 1949 |